June 20, 1950        J. G. FONTAINE        2,512,228
AUTOMOBILE FRAME STRAIGHTENING EQUIPMENT
Filed July 30, 1948
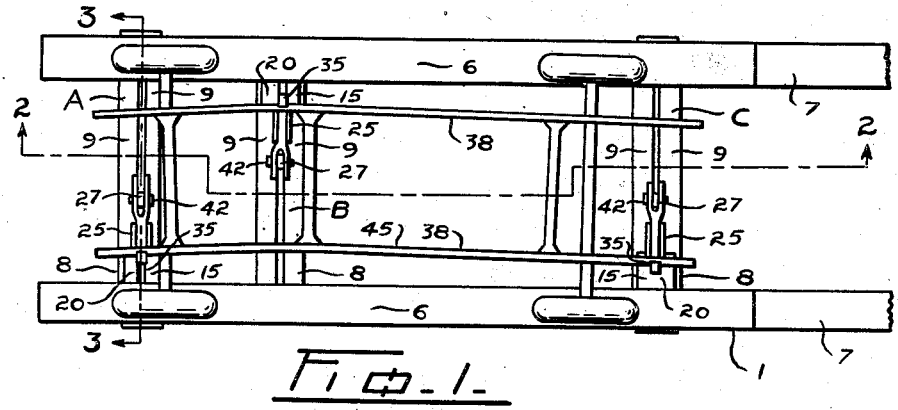
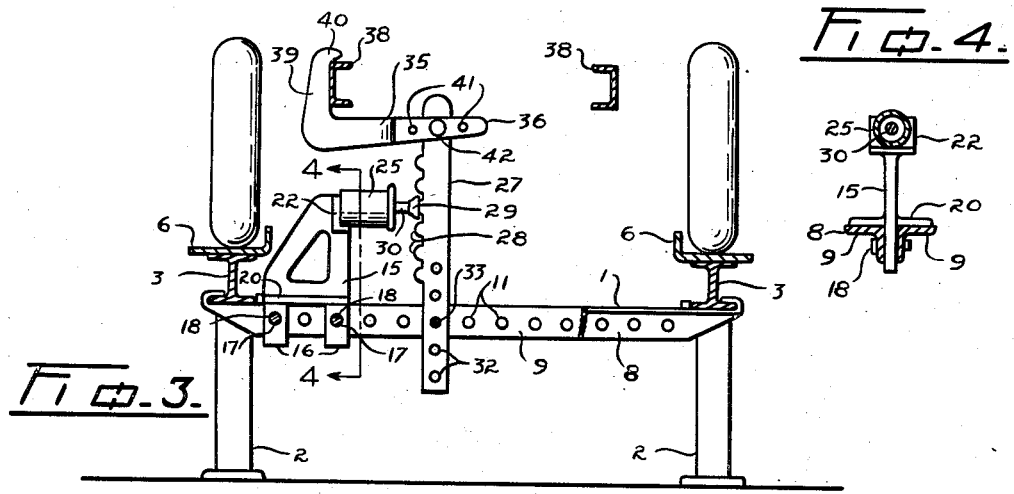
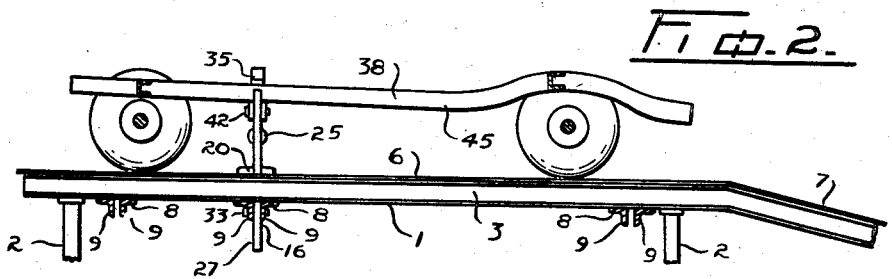
INVENTOR
JOHN GARFIELD FONTAINE
ATTORNEY Patented June 20, 1950

2,512,228

UNITED STATES PATENT OFFICE 2,512,228

AUTOMOBILE FRAME STRAIGHTENING EQUIPMENT

John Garfield Fontaine, Vancouver, British Columbia, Canada

Application July 30, 1948, Serial No. 41,642

1 Claim. (Cl. 153—32)

My invention relates to improvements in automobile frame straightening equipment, which is adapted for use with a rack on which automobiles and trucks are supported for the facility of mechanics working on steering and alignment defects.

The principal object of the invention is to provide means whereby transverse thrust of any desired magnitude may be applied to different parts of an auto frame to restore it to its original shape. Further objects are to so apply the thrust that there is no tendency for the frame contacting elements to slip in any direction while increasing the thrust being applied thereto, and to provide means whereby the base member through which the counterthrust to the frame is applied is incapable of endwise slippage across the rack.

Referring to the drawings—

Fig. 1 is a plan view of the invention applied to an automobile frame to straighten out a transverse bend therein.

Fig. 2 is a longitudinal sectional view taken on the line 2—2 of Figure 1.

Figure 3 is an enlarged transverse view taken on the line 3—3 of Figure 1.

Fig. 4 is a view taken on the line 4—4 of Figure 3.

In the drawings like characters of reference indicate corresponding parts in each figure.

For clarity, wheels and longitudinal frame members of the automobile only are shown.

The numeral 1 indicates generally an elevated rack formed with vertical standards 2 supporting a pair of spaced heavy H beams 3, each of which is surmounted by a broad track 6. The beams 3 are of sufficient strength or are otherwise suitably cross braced to withstand any strains to be applied to the frame of a vehicle standing upon the tracks 6.

The rack 1 is usually provided with a ramp 7 along which a vehicle is driven to place it in position to be worked upon.

Slidably fitted to the underside of the beams 3 are transverse members 8 formed of spaced angle sections 9 with their vertical legs provided with spaced apertures 11 and having their horizontal legs folded over at opposite ends to form hooks 12, which hooks engage the lower outer flanges of the beams 3. These hooks 12 serve to prevent endwise movement of the transverse members 8 and to enable them to be slid freely lengthwise of the beams to any desired position. Each of the transverse members 8 is adapted to carry a jack support 15, which consists of a substantially triangular frame having a pair of downwardly projecting legs 16 spaced apart, which are apertured as at 17 to register with any adjacent pair of apertures 11 and to receive pins 18 for the purpose of holding said jack support in any position along the transverse member 8. A pair of webs 20 extend along the sides of the support 15 to limit its downward movement into the interspace between the vertical legs of the angle sections 9 and to facilitate its sliding movement along the transverse member 8. A step 22 is provided at the upper end of the vertical edge 23 of the support, on which a hydraulic or other appropriate jack 25 is adapted to be placed.

The transverse members 8 are also adapted to pivotally support a beam 27 provided along one of its edges with a plurality of protuberances 28 conforming substantially to the usual recess in the cap 29 of the jack plunger 30 to prevent slippage of said cap lengthwise of the beam. The lower end of the beam is provided with a vertical row of spaced apertures 32 for pivotally connecting said beam at any desired place to the transverse member 8 by means of a pin 33.

A hook member 35 having a forked shank 36 is provided for engaging a side channel 38 or other part of the automobile frame supported above the rack 1. The hook member 35 has a vertical bearing part 39 which is inturned at its upper end as at 40 to hook over the engaged frame member and prevent downwise slippage and the forked shank 36 is provided with apertures 41 to register with an aperture in the beam and to receive a pin 42 to pivotally couple the hook member and the beam together.

Assuming the automobile frame 45 to have its longitudinal frame members 38 bent forward of its longitudinal centre as shown in Figure 1, a transverse member 8 will be placed in the positions A, B and C (see Figure 1) and the equipment consisting of a jack support 15, jack 25, beam 27 and hook member 35 will be fitted in appropriate position, with the hook members of A and C being applied to the outerside of the left frame member 38 adjacent its ends and the hook members 35 of the B against the outer side of the right frame member adjacent the point of bend. The several jacks are actuated to take up any slack existing between the hook members and their frame contacts, then the jack at B position is actuated as required to correct the disalignment of the frame members by urging the beam 27 to swing about its pivot pin 33, thus causing the complementary hook member 35 to thrust against the adjacent side frame member 38 with appropriate force. It will be observed that by adjusting the several parts of the equipment the application of pressure can be made to any part of the automobile frame irrespective of its height above the level of the tracks 6.

What I claim as my invention is:

Automotive frame straightening equipment adapted for use with a pair of spaced tracks on which a vehicle is adapted to be supported, said equipment comprising a transverse member having a slot extending longitudinally thereof, said member being adapted to extend transversely from one track to the other and be slidable therealong, a jack support having side members adapted to form transverse member engaging guides, and a lug adapted to project through the slot and below said side members, pins for detachably securing the jack support against movement lengthwise of the transverse member, a beam extending into said slot and being pivotally connected to said transverse member and extending thereabove, said beam being set in spaced relation to the jack support, a jack carried by the support for urging the beam away from the jack support, a forked hook shaped member pivotally mounted for free swinging movement about the upper end of the beam engaging a frame member of the vehicle.

JOHN GARFIELD FONTAINE.

REFERENCES CITED

The following references are of record in the file of this patent:

UNITED STATES PATENTS

| Number | Name | Date |
| --- | --- | --- |
| 1,889,187 | Wochner | Nov. 29, 1932 |
| 1,993,387 | Smith | Mar. 5, 1935 |
| 2,022,912 | Heineman | Dec. 3, 1935 |
| 2,140,686 | Bennett | Dec. 20, 1938 |
| 2,348,697 | Smith | May 9, 1944 |
| 2,372,509 | Merrill et al. | Mar. 27, 1945 |
| 2,442,425 | Merrill et al. | June 1, 1948 |